(12) United States Patent
Berbert

(10) Patent No.: US 9,505,508 B2
(45) Date of Patent: Nov. 29, 2016

(54) PACKAGE FORMED FROM PATTERN LAMINATED DOUBLE WALL HOT FORMABLE PLASTIC WEBS WITH ENHANCED PUNCTURE RESISTANCE

(71) Applicant: Otacilio T. Berbert, Oshkosh, WI (US)

(72) Inventor: Otacilio T. Berbert, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 399 days.

(21) Appl. No.: 14/301,722

(22) Filed: Jun. 11, 2014

(65) Prior Publication Data

US 2014/0295116 A1   Oct. 2, 2014

Related U.S. Application Data

(63) Continuation of application No. 13/474,687, filed on May 17, 2012, now abandoned.

(51) Int. Cl.
| | |
|---|---|
| B65B 25/06 | (2006.01) |
| B32B 7/14 | (2006.01) |
| B32B 7/12 | (2006.01) |
| B65B 31/02 | (2006.01) |
| B32B 27/08 | (2006.01) |
| B32B 3/08 | (2006.01) |
| B32B 3/12 | (2006.01) |

(52) U.S. Cl.
CPC ............ *B65B 25/065* (2013.01); *B32B 3/085* (2013.01); *B32B 3/12* (2013.01); *B32B 7/12* (2013.01); *B32B 7/14* (2013.01); *B32B 27/08* (2013.01); *B65B 31/028* (2013.01); *B32B 2307/31* (2013.01); *B32B 2307/7244* (2013.01); *B32B 2439/70* (2013.01); *Y10T 428/1352* (2015.01); *Y10T 428/24331* (2015.01); *Y10T 428/24843* (2015.01)

(58) Field of Classification Search
None
See application file for complete search history.

(56) References Cited

U.S. PATENT DOCUMENTS

| | | |
|---|---|---|
| 3,956,867 A | 5/1976 | Utz et al. |
| 4,529,641 A | 7/1985 | Holtrop et al. |
| 4,735,855 A | 4/1988 | Wofford et al. |
| 4,909,726 A | 3/1990 | Bekele |
| 5,495,705 A | 3/1996 | Miura et al. |
| 6,085,903 A | 7/2000 | Jotcham et al. |

(Continued)

FOREIGN PATENT DOCUMENTS

| | | |
|---|---|---|
| EP | 1026215 A1 | 8/2000 |
| EP | 1177891 A1 | 2/2002 |

(Continued)

*Primary Examiner* — Gerard Higgins
(74) *Attorney, Agent, or Firm* — Tom J. Hall

(57) ABSTRACT

The present disclosure is concerned with packages formed from thermoformable webs with improved puncture resistance suitable for use in semi-automatic horizontal form fill and seal (HFFS) packaging machines and a process for packaging hard food items with sharp angular surfaces using such webs in such machines. The webs have a double wall partially laminated structure. The structure is conveniently formed by adhesively laminating two component films in a face to face configuration using a pattern of adhesive which leaves a substantial portion of the two facing surfaces unlaminated. The lamination just needs to be sufficient that the two component films will hot form together when they are vacuum drawn into a die to form a cavity for packaging the food items. The lamination pattern can vary from just edge strips to the edge strips and a honey comb pattern or a pattern of dots over the facing surfaces between the edge strips.

10 Claims, 8 Drawing Sheets

(56) References Cited

U.S. PATENT DOCUMENTS

| | | |
|---|---|---|
| 6,455,138 B1 | 9/2002 | Murano |
| 6,858,106 B1 | 2/2005 | Ikenoya |
| 7,434,692 B2 | 10/2008 | Ginsberg et al. |
| 7,632,370 B2 | 12/2009 | Van Driesten et al. |
| 7,726,484 B2 | 6/2010 | Komatsu et al. |
| 7,726,486 B2 | 6/2010 | Jones |
| 8,603,609 B2 * | 12/2013 | Fraser ............... B32B 37/0076 428/166 |
| 9,242,431 B2 * | 1/2016 | Cruz ........................ B32B 7/14 |
| 2007/0254120 A1 | 11/2007 | Rasmussen |
| 2010/0199610 A1 | 8/2010 | Komatsu et al. |
| 2011/0117307 A1 | 5/2011 | Fraser et al. |
| 2012/0134606 A1 | 5/2012 | Borchardt et al. |

FOREIGN PATENT DOCUMENTS

| | | |
|---|---|---|
| EP | 1285744 A1 | 2/2003 |
| EP | 0787656 B1 | 5/2003 |
| EP | 2070837 A1 | 6/2009 |
| WO | 0046316 | 8/2000 |
| WO | 2009077841 A1 | 6/2009 |

* cited by examiner

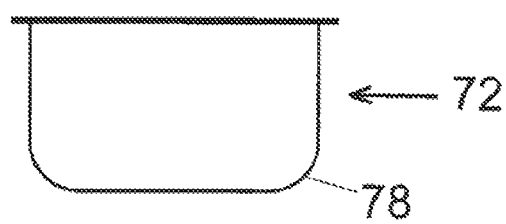
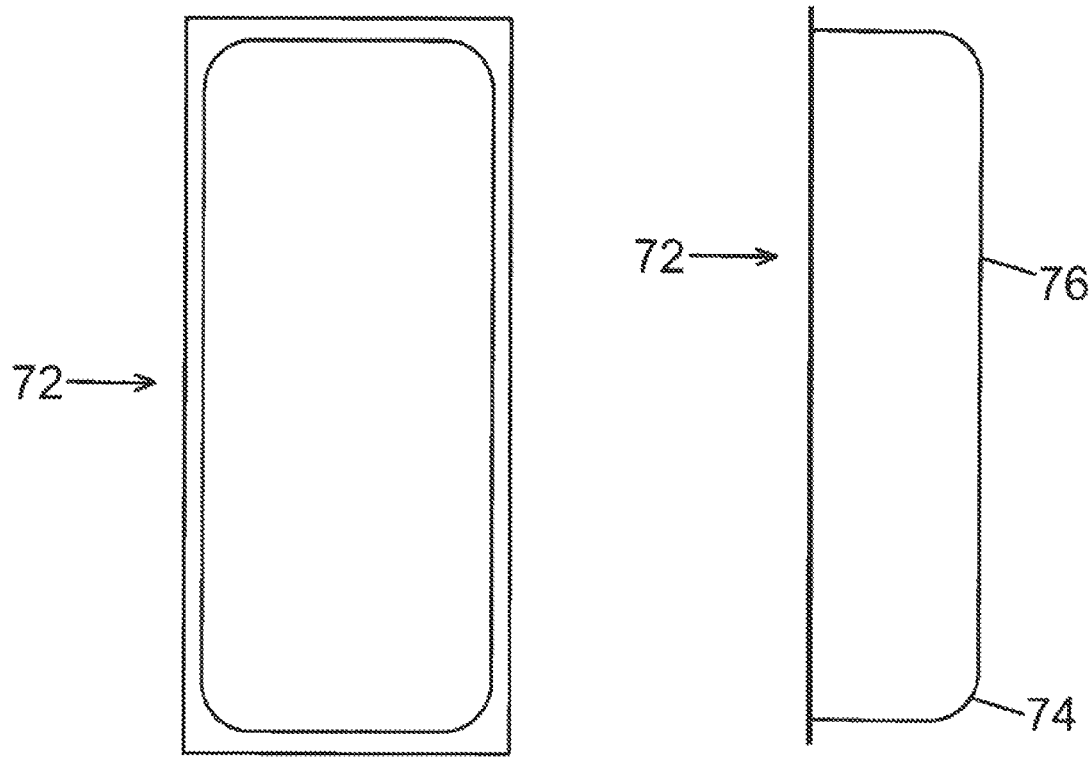

PACKAGE FORMED FROM PATTERN LAMINATED DOUBLE WALL HOT FORMABLE PLASTIC WEBS WITH ENHANCED PUNCTURE RESISTANCE

The present patent application is a continuation of application Ser. No. 13/474,687, filed May 17, 2012, the entirety of which is incorporated in this application by this reference.

BACKGROUND OF THE INVENTION

In the packaging of food products in thermoplastic film there have been attempts to address the problem of puncture of the film in various ways to assure both isolation from the atmosphere and to prevent leakage of liquids which may be present in the package. For meat products which contain bones which can be placed in a fixed relationship to the packaging, the practice has developed of applying a "patch" of polymer film on top of the primary packaging. Typically this "patch" has been adhered to the primary packaging film by a corona treatment of the facing surfaces or by covering the facing surfaces with an appropriate adhesive. Over time the size of the "patch" has evolved to cover almost the entire surface of the package thus making the location of bone less critical. However, this approach is not suitable for use with the semi-automated packaging approach wherein a cavity is thermoformed into a thermoplastic web, the food product is placed into the cavity and a portion of a second thermoplastic web is heat sealed over the open mouth of the cavity such as is taught by U.S. Pat. No. 3,956,867 to U Z et al. of Multivac. Another approach has been to simply drop "patches" into the already formed cavity before the food product is placed in the cavity in order to provide extra puncture resistance.

The approach of simply increasing the thickness of the web used to form the cavity has not met with much success. This approach is limited by the need to still be able to thermoform the web to form the cavity and the need to limit the expense of the packaging material. The need to control the expense also limits the selection of more puncture resistant materials.

Reasonable puncture resistance can be obtained using oriented shrink film which has been partially annealed to render it compatible with hot forming. But the present invention provides a film structure which does not require the use of such films.

SUMMARY OF THE INVENTION

The present invention involves packages formed form a web with a heat sealable surface suitable for packaging food items with sharp edges which is hot formable and has increased puncture resistance. The improved puncture resistance is obtained by forming the web out of two thermoplastic films which have been partially laminated to each other in a manner such that a substantial portion of the two surfaces facing each other are unlaminated but also such that the partially lamination is adequate that the web can be hot formed as a single unit. In a preferred embodiment the invention involves films which have been partially adhesively laminated. In another preferred embodiment less than about 50% of the facing surfaces are laminated, more preferably less than about 25%. It is preferred that the partially laminated web be capable of being formed into cavities of substantial depth by being vacuum drawn into a mold with it being especially preferred that the double wall web be capable of draws of about 2 inches or greater.

It is preferred that the two edges of the two partially laminated films which run in the machine direction are continuously laminated to provide a web with sealed side edges. It is especially preferred that the lamination sites between the two films form a regular repeating pattern. It is particularly preferred that the pattern be either a honeycomb with the spaced apart circles as the unlaminated areas or spaced apart dots or circles of lamination. It is particularly convenient if the lamination is effect with the use of an adhesive. A particularly preferred class of adhesives is the two part polyurethane adhesives, particularly those available with solids content greater than about 30 wt %.

In a preferred embodiment at least one of the films of the partially laminated web includes an oxygen barrier. It is particularly convenient if both films contain an oxygen barrier, thus providing protection for the packaged food item even if one of the component films is punctured. An especially convenient construction is one using two identical films as the components. It is also particularly helpful if the surfaces of the two component films which face each other are heat sealable to each other. The component films typically each have a thickness between about 2 and 24 mils, preferably between 4 and 20 mils.

It is advantageous if the component films are blown films without substantial stored shrink forces. The partially laminated structure of the web provides a puncture resistance similar to that available from annealed biaxially oriented films with substantial stored shrink energy. In the production of thermoplastic flexible packaging films by extrusion, the biaxially oriented films are stretched along their lengths and across their widths after formation and then cooled down too quickly to relieve the stresses induced by this stretching. If this film is destined to be used in a hot forming operation it is partially annealed without full relief of these stresses. Nonetheless these films are characterized as having substantial stored shrink forces because if they are heated to an appropriate temperature they will display substantial shrinking. Indeed, one of the motivations of biaxially orienting such films is to give them the capacity to heat shrink.

The present invention also involves a process for packaging hard food items with sharp angular surfaces by hot forming open mouth cavities using the double wall partially laminated web described hereinabove, placing the food items into the cavity, covering the cavity with a web of thermoplastic film, evacuating the interior of the cavity, heat sealing the covering thermoplastic film to the cavity and separating the sealed package from the remainders of the webs. In a preferred embodiment, the step of forming the cavity involves deep drawing the double wall partially laminated web into a mold using a vacuum. In a particularly preferred embodiment the draw into the mold is about two inches or greater. In an advantageous embodiment, the hard food items are bones or meat products containing bones, especially exposed bones. In a preferred embodiment the covering web of thermoplastic film is also a double wall partially laminated web of two independently manufactured thermoplastic webs.

BRIEF DESCRIPTION OF THE DRAWINGS

FIG. 6B is a side elevation of a single shallow draw die 72 showing its radiused corner 78 along its long dimension.

FIG. 6C is a plan view of a single shallow draw die 72 showing its open mouth 73 and its perimeter ledge 75.

FIG. 6D is an end elevation of a single shallow draw die 72 showing its radiused corner 74 along its short dimension and its bottom 76.

DETAILED DESCRIPTION OF THE INVENTION

Figure 1:
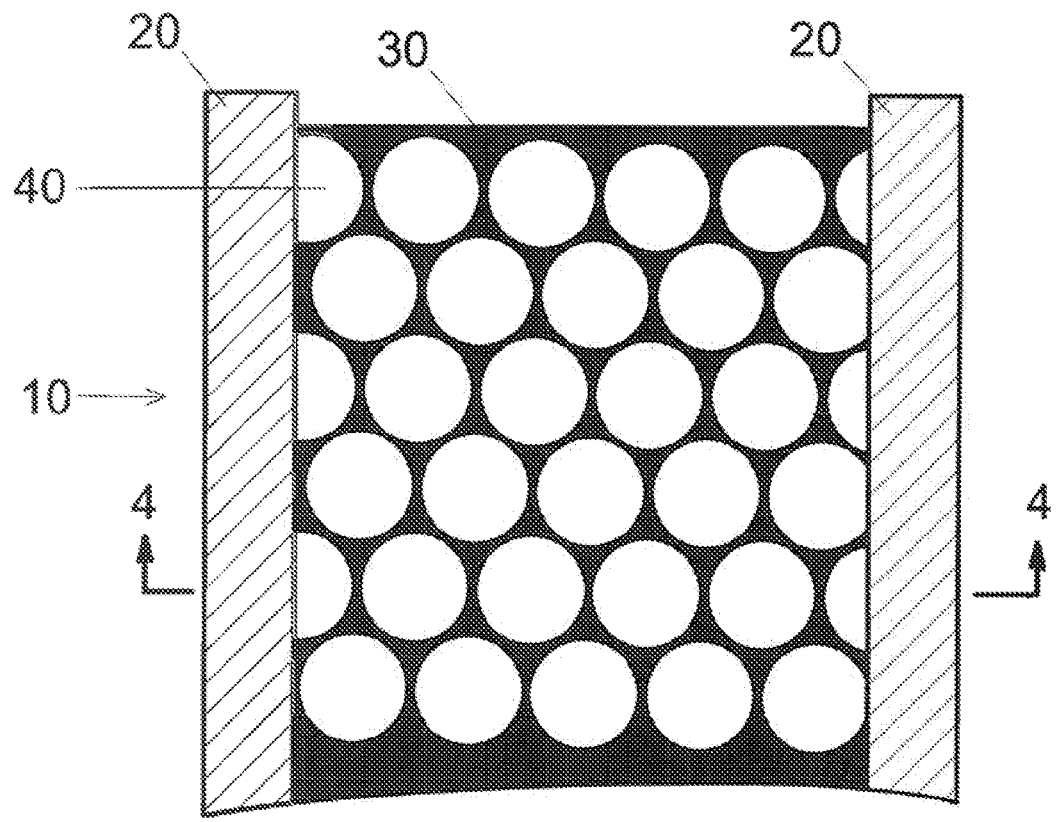
FIG. 1 is a top plan view of the partially laminated film 10 showing the two strips of adhesive 20 adhering the edges of the top film 12 to the edges of the bottom film 14 which are illustrated in FIG. 4. Also shown is a honeycomb pattern of adhesive 30 with the resultant circular voids 40.

The present invention involves packages formed from hot formable webs which have improved puncture resistance obtained in an economical manner by a particular structure involving the partial adhesive lamination of two independently formed thermoplastic films. This structure is capable of being used in the well-known packaging procedure of hot forming a cavity from a flat web by vacuum drawing it into a die, placing the items to be packaged into the cavity, evacuating the cavity and sealing the open mouth of the cavity with a thermoplastic film by heat sealing it to the web from which the cavity was formed. This structure involves a pattern of adhesive lamination which leaves substantial areas of the internal surfaces both films which face each other unlaminated. It is believed that there is a balance between complete lamination between the entire areas of the two facing surfaces, which offers less puncture resistance and such minimal lamination that the two film components are not able to properly form into a hot drawn cavity in this well know packaging procedure. This partial lamination approach provides puncture resistance formerly only available from much more expensive thermoplastic film.

The component films used to form the partially laminated double wall webs can be any of the thermoplastic films known for use in the flexible packaging industry. These films should, of course, be hot formable in the vacuum forming operation and should be adhesively laminatable to each other. In addition, at least one of them should have a surface opposite its lamination surface (i.e. the surface which faces the other component film) which is heat sealable under typical industry conditions. If the items to be packaged are subjected to accelerated degradation on exposure to atmospheric oxygen, such as various food items including animal derived products, it is desirable to include an oxygen barrier in the film structure of one of the component films. It is particularly desirable to include an oxygen barrier in the structure of both component films so that a partial puncture through just one of the oxygen barriers will not compromise the oxygen barrier integrity of the resultant packaging. It is convenient to just partially adhesively laminate two identical films.

Component film structures with a core layer of ethylene vinyl alcohol (EVOH) and an exterior layer of a fairly low softening point polyolefin or with a low melting point component are particularly useful for making the partially laminated double wall webs. One approach to this exterior layer is a blend of a linear low density polyethylene (LL-DPE) with a low density polyethylene (LDPE) and suitable additive for slip and blocking. Films with an EVOH core sandwiched between two polyamide layers are the basis for a number of films suitable far the partially laminated double wall webs. The polyamide layers have been found useful in stabilizing the EVOH layer during thermal processing, have good adhesion to the EVOH and impart good mechanical strength to the film structure. A convenient way to marry this core to heat sealable exterior layers is through the use of polyethylene exterior layers joined to the polyamide (or nylon) layers via tie layers well known in the industry for promoting extrusion adhesion between polyethylene layers and polyamide layers. Among these are polyethylene copolymers which have been modified to carry anhydride functionality. Seven layer films based upon this approach have found favor in the flexible packaging industry and are particularly well suited as component films for the partially laminated double wall webs. These component films are conveniently made by the well know melt extrusion technique in which multiple extruders feed a single extrusion die, with each extruder being responsible for the production of a particular layer.

The adhesive used to join the component films can be any of those commonly used in the flexible packaging industry. It is convenient if the adhesive has sufficient viscosity to retain the pattern in which it is applied. The particular properties of the adhesive will to some extent depend on the manner in which it is applied such as whether it is applied as a solid or out of a solution. Particularly convenient are the two part polyurethane adhesives, particularly those available with solids content greater than about 30 wt %.

The partially laminated webs with which the present invention is concerned are particularly suitable for use in the packaging process described in U.S. Pat. No. 3,956,867, incorporated by reference herein. In this procedure a flat web of a thermoplastic film is drawn over the mouth of one or more dies generally of the shape of the cavity desired for packaging goods, commonly food items, and heated to a forming temperature, typically by being drawn against a heated platen. This film is then drawn into the die or dies by pulling a vacuum from the bottom of the die. The open mouth of each die is typically surrounded by a gasket which forms a seal with the portion of this film which is laid over the gasket to maintain a vacuum as the film is drawn into the die. The cavities which are formed are then moved forward a set amount to allow the formation of cavities in another portion of the web and to allow the just formed cavities to be filled with the items to be packaged. The now filled cavities are covered with another thermoplastic film and advanced into an evacuation chamber. In this chamber the air is drawn out of the cavity and then the appropriate portions of the covering film is heat sealed across the mouths of the cavities to create sealed evacuated packages. Air is then bled back into the evacuation chamber and the sealed packages are separated from the balance of the webs from which the cavities and top covers were formed by appropriately operating shears or other cutting devices. In packaging items with sharp or hard edges such as bones or meat with protruding bones, it is advantageous to first bleed air into the top of evacuation chamber such that the contents of the package are not forced into the top cover by air entering the bottom of the chamber. In the usual machine arrangement this top cover is adjacent a plate so there is a potential for hard packaged items to press this film into this plate and cause a puncture if an air cushion is not provided by advanced venting into the top of the evacuation chamber.

This procedure allows the use of less expensive cover films that have less inherent puncture resistance.

The lamination pattern of the double walled films with which the present invention is involved should ensure that the two component films do not exhibit any noticeable separation from each other when formed into a cavity in the manner discussed hereinabove. In this regard, it has been observed that if two thermoplastic webs are simply laid one atop the other, heated to a forming temperature and then vacuum drawn in a mold they will separate with the top film not being drawn as deeply into the mold as the bottom film which faces the source of the vacuum. This may be a reflection of the ability of air at ambient pressure to penetrate between the two films. Thus it may be advantageous to use a lamination pattern which prevents or substantially inhibits this penetration.

The advantages of the present invention can best be realized by using thermoplastic films commonly employed with the semi-automatic hot form machines to form the double walled partially laminated structure. Among these the blown films, particularly those of thinner gauges are particularly preferred. The film structure of the present invention is thus able to provide as good or better puncture resistance as can be obtained from partially annealed biaxially oriented films without the need to employ such films. The desired puncture resistance might also be obtainable by increases in web gauge but this poses problems of not only cost but also formability. As the gauge or thickness increases, the ability to form into cavities decreases to the point where plug assist molding becomes required and ultimately to the point that deeper molds are very difficult to fill. The present invention therefore provides the ability to obtain the desired puncture resistance with an inexpensive readily formable web.

The double walled partially adhesively laminated films with which the present invention is concerned are particularly attractive for the packaging of less expensive meat products. Among these are the products known in the meat industry as offal. Many of these products have high bone content or, in some cases, are essentially bones. This creates a greater risk of puncture of the packaging film by the packaged product.

Figure 2:
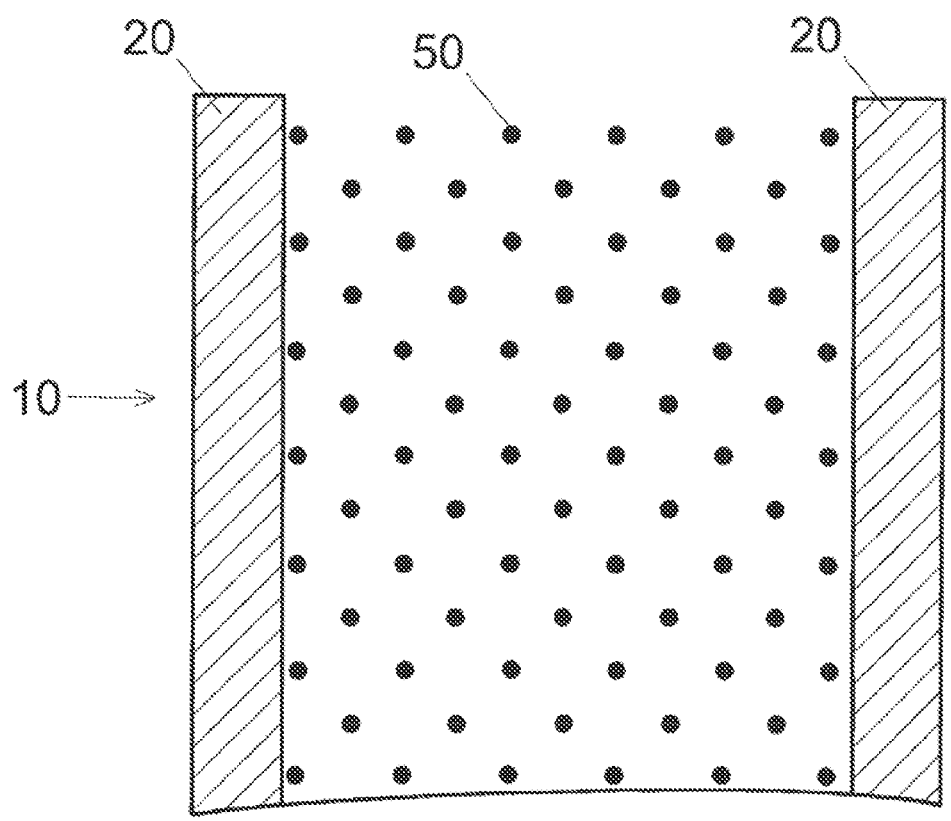
FIG. 2 is a top plan view of an alternative embodiment of the partially laminated film 10 showing the two strips of adhesive 20 adhering the edges of the top film 12 to the edges of the bottom film 14 and also showing the dot pattern of adhesive 50.
Figure 3:
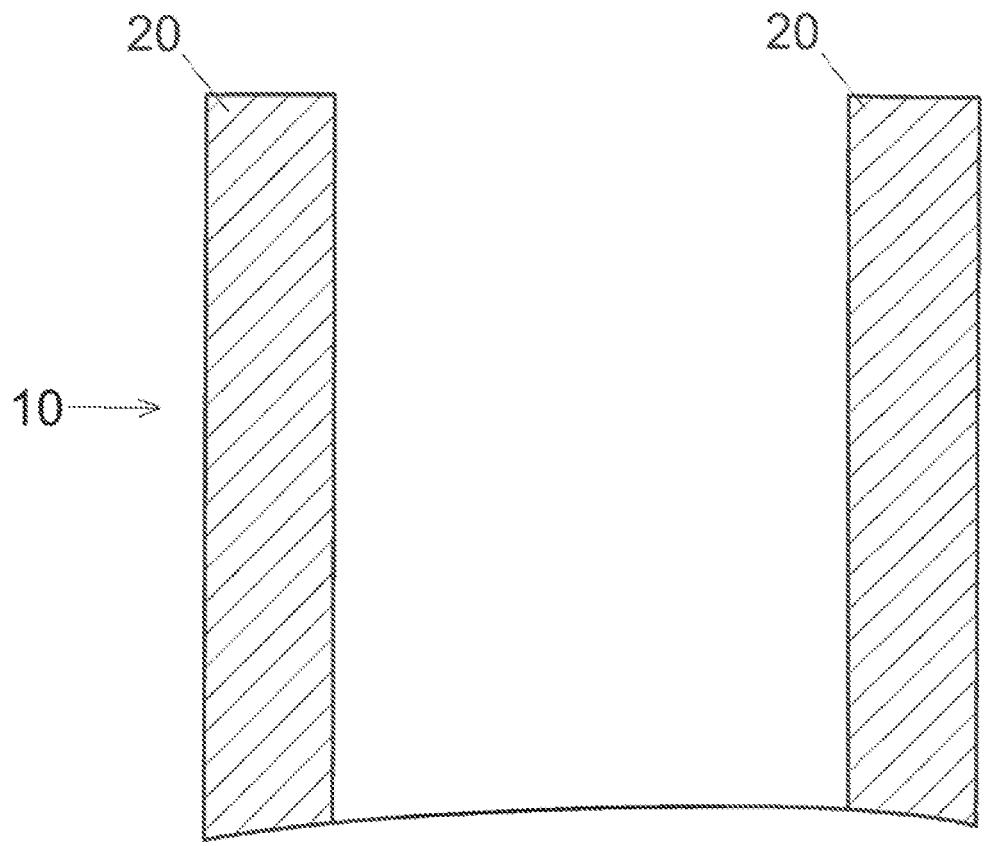
FIG. 3 is a top plan view of another alternative embodiment of the partially laminated film 10 showing the two strips of adhesive 20 adhering the edges of the top film 12 to the edges of the bottom film 14. In this embodiment the only adhesive connection between top film 12 and bottom film 14 are the edge strips 20.
Figure 4:
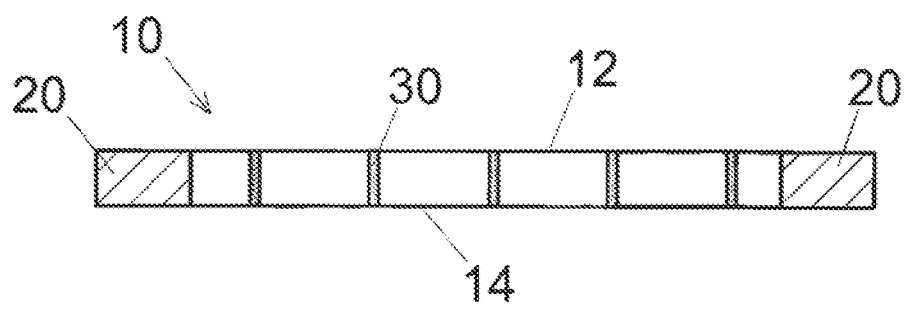
FIG. 4 is a cross section of the partially laminated film 10 along line 4-4 of FIG. 1. It shows the top film 12 joined to the bottom film 14 by the side strips of adhesive 20 and the honey comb pattern of adhesive 30.
Figure 5A:
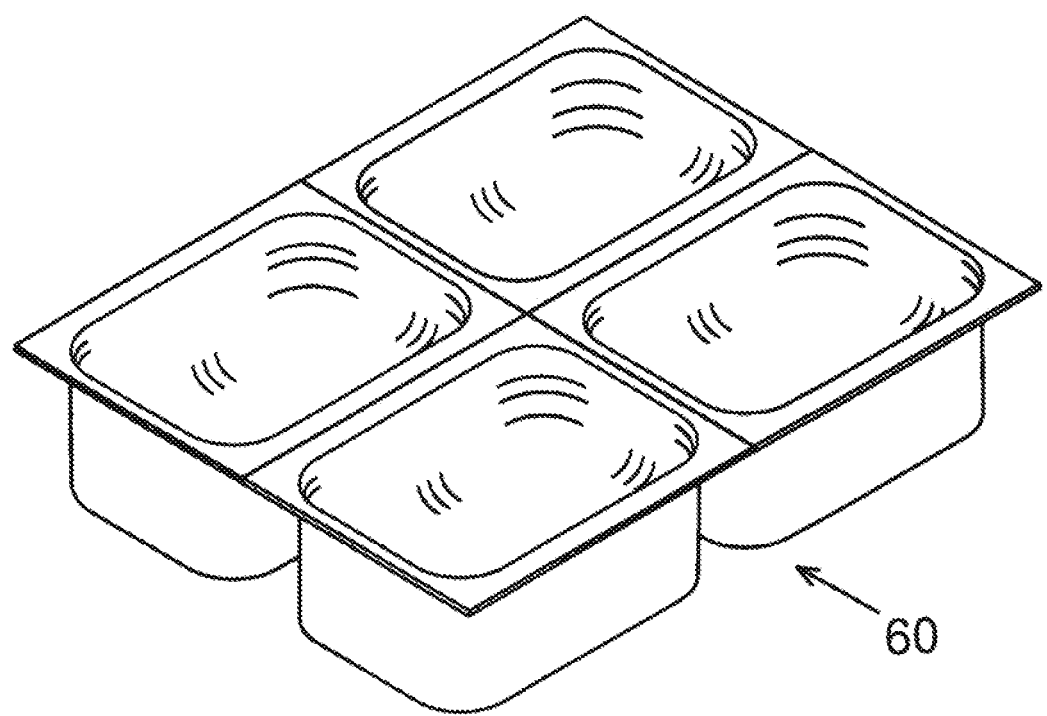
FIG. 5A is a perspective view of a four die set up 60 for the formation of cavities by deep hot vacuum draw.
Figure 5B:
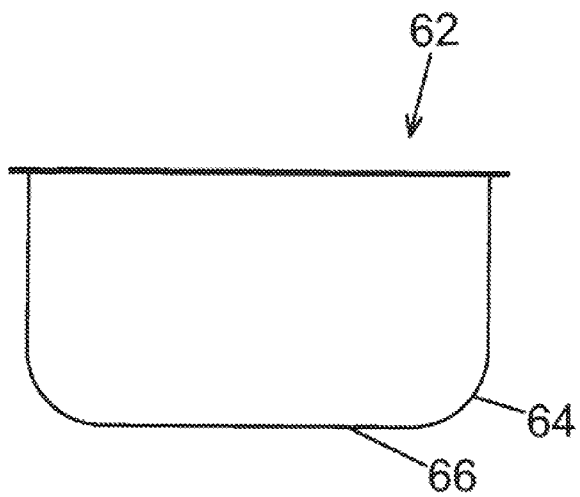
FIG. 5B is a side elevation of a single deep draw die 62 showing its radiused corner 64 along its short dimension and its bottom 66.
Figure 5C:
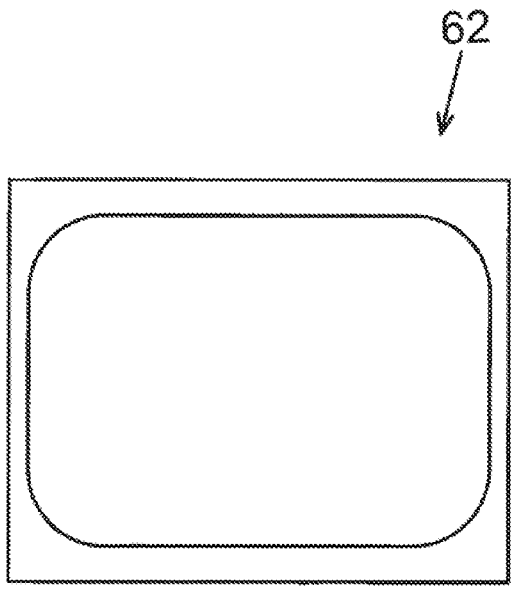
FIG. 5C is a plan view of a single deep draw die 62 showing its open mouth 63 and its perimeter ledge 65.
Figure 5D:
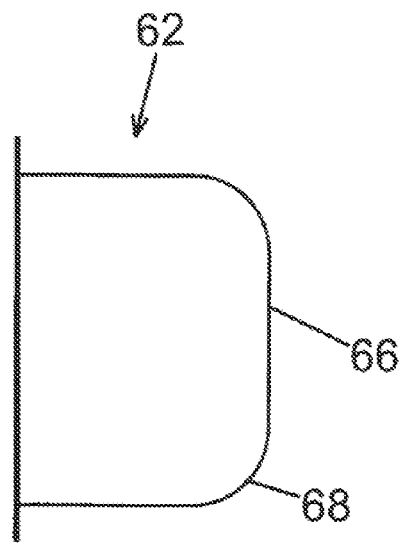
FIG. 5D is an end elevation of a single deep draw die 62 showing its radiused corner 68 along its long dimension and its bottom 66.

The construction of suitable partially laminated double walled films is illustrated in FIG. 1-4. In FIG. 1 two thermoplastic films have been laminated in a face to face configuration to yield the double wall partially laminated film 10. The lamination is effected using two side strips of adhesive 20 and a honeycomb pattern of adhesive 30 between the centers of the two facing surfaces. This leaves circular voids 40 between the two facing surfaces. The resulting cross-section along line 4-4 is shown in FIG. 4. The component films 12 and 14 are adhered together by both the side strips of adhesive 20 but also the honeycomb pattern of adhesive 30. FIG. 2 illustrates an alternative approach in which the adhesive pattern between the facing surfaces of the component films is a pattern of circular dots of adhesive 50, along with the side strips of adhesive 20. FIG. 3 illustrates a third alternative in which the two component films are simply adhered together with the side strips of adhesive 20.

The hot forming dies of the semi-automatic packaging machines with which the double wall partially laminated thermoplastic webs with which the present invention is concerned find particular utility are illustrated in FIG. 5-6. FIG. 5A illustrates a set of four deep draw dies 60 which are to be covered by a single portion of the double wall web. After that portion is drawn into the dies to form four cavities, the dies are moved down, out of the way, and the web is indexed forward in the machine direction 61 so that an unformed portion of the web now covers the dies. FIG. 5B and FIG. 5D illustrate the profile of an individual die 62. The web is drawn to the bottom of the die 66 and in being so formed it is caused to conform to the radiused corners along the width of the cavity 64 and along the length of the cavity 68. FIG. 5C illustrates the open mouth 63 and perimeter ledge 65 of the die 62. Later in the process a portion of another thermoplastic web (which may or may not be double walled) will be brought into position to cover the open mouth 63 and will be heat sealed to the perimeter ledge 65 to create a sealed package.

In some cases the deep draw of mold 64, typically in the range of 3 inches, may result in too great a thinning of the double wall web to give the puncture resistance desired with some items to be packaged. The depth of the draw is provided by the thermoplastic stretching of the web drawn into the die and, of course, as it is stretched it thins.

Figure 6A:
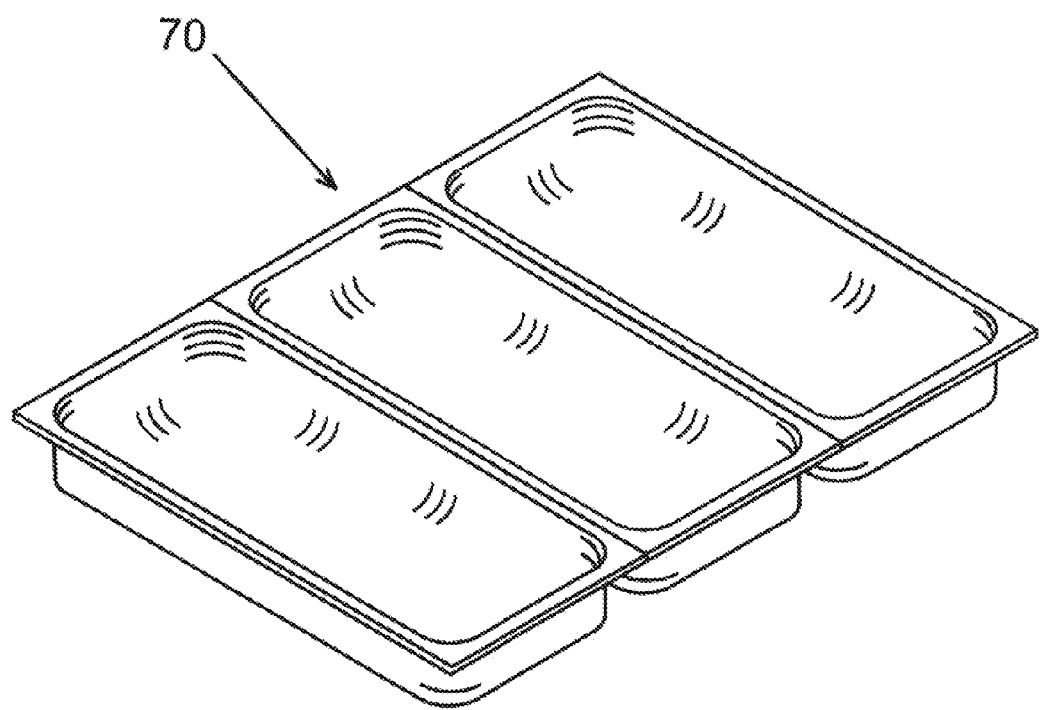
FIG. 6A is a perspective view of a four die set up 70 or the formation of cavities by shallow hot vacuum draw.

FIG. 6 A-D illustrate an approach that involves a shallower hot draw for use with items that are more difficult to package with these semi-automatic packaging machines. FIG. 6A illustrates a set of three shallow draw dies 70 which are to be covered by a single portion of the double wall web. After that portion is drawn into the dies to form four cavities, the dies are moved down, out of the way, and the web is indexed forward in the machine direction 71 so that an unformed portion of the web now covers the dies. FIG. 6B and FIG. 6D illustrate the profile of an individual die 72. The web is drawn to the bottom of the die 76 and in being so formed it is caused to conform to the radiused corners along the width of the cavity 74 and along the length of the cavity 78. FIG. 6C illustrates the open mouth 73 and perimeter ledge 75 of the die 72. Later in the process a portion of another thermoplastic web (which may or may not be double walled) will be brought into position to cover the open mouth 73 and will be heat sealed to the perimeter ledge 75 to create a sealed package. The shallower draw, typically in the range of about 1½ inches, results in less thinning of the double wall web thus preserving greater puncture resistance. This results in packaging better suited for some difficult to package items such as marrow bones.

WORKING EXAMPLES

Example 1

Pork neck bones were packaged using a Multivac packaging machine which thermally formed an open mouth cavity in a thermoplastic web into which into which the neck bones were placed, followed by covering the open mouth with another thermoplastic web, evacuating the air in the cavity, heat sealing a portion of the covering web to the mouth of the cavity to create a sealed package and separating the sealed package from the remainder of the two webs. The packages were formed with three different types of film used as the cavity forming web. The finished and isolated packages were evaluated for leakage of contained fluid immediately after formation, after a twenty four period and after distribution testing.

The formation of the sealed packages was generally done in accordance with the teachings of U.S. Pat. No. 3,956,867 to Utz et al. of Multivac, incorporated by reference herein. However, unlike the teachings of this patent no attempt was made to cause shrinkage of the portion of the web which formed the cavity.

The three cavity forming webs were a partially laminated film in accordance with the present invention, a unitary film of about the same thickness with a particularly high nylon content and a biaxially oriented partially annealed film with a slightly lesser thickness. The laminated film was about 10 mils thick and was the result of partially adhesively laminating a 6 mil 7 layer blown film to a 4 mill layer blown film with both films containing an ethylene vinyl alcohol (EVOH) oxygen barrier. The unitary film with the high nylon content was a 10 mil seven layer blown film with EVOH oxygen barrier. The biaxially oriented film was a 8 mil 14 layer film obtained from double bubble processing a 7 layer film with blow up and draw ratios both in excess of 2 and processing the film after orientation as a collapsed bubble.

The partially laminated film was made by using a honeycomb pattern of a two component polyurethane adhesive in which the circular adhesive free voids were 60 mm in diameter and were spaced 5 mm apart at their closest giving an adhesive surface area of approximately 21.5% of the total surface area. The film structure for the 6 mil component was multilayered with the general composition and weight percentage of each layer being as follows: 18.8% of a mixture of ultralow density polyethylene (ULDPE) and linear low density polyethylene (LLDPE) with 87.7 wt % of ULDPE, 10 wt % LLDPE and the balance additives/14.6% of tie layer for nylon adhesion (90 wt % ULDPE and 10 wt % anhydride modified LLDPE)/14.7% of amorphous Nylon (85 wt % Nylon 6 and 15 wt % Nylon 6I/6T)/8% ethylene vinyl alcohol (EVOH)/14.7% of amorphous Nylon (85 wt % Nylon 6 and 15 wt % Nylon 6I/6T)/14.6% of tie layer for nylon adhesion (90 wt % ULDPE and 10 wt % anhydride modified LLDPE)/14.7% Nylon (77 wt % Nylon 6, 15 wt % Nylon6I/6T, balance additives). The film structure for the 4 mil component was multilayered with the general composition and weight percentage of each layer being as follows: 14% of a mixture of low density polyethylene (LDPE) and LLDPE (65.7 wt % LLDPE, 30 wt % LDPE, balance additives)/18% of tie layer for nylon adhesion (84 wt % ULDPE and 16 wt % anhydride modified LLDPE)/12% amorphous Nylon (85 wt % Nylon 6 and 15 wt % Nylon 6I/6T)/12% EVOH/12% amorphous Nylon (85 wt % Nylon 6 and 15 wt % Nylon 6I/6T)/18% of tie layer for nylon adhesion (84 wt % ULDPE and 16 wt % anhydride modified LLDPE)/14% of a mixture of LDPE and LLDPE (84.2 wt % LLDPE, 10 wt % LDPE, balance additives). The ULDPE+LLDPE layer of the 6 mil component and one of the outer layers of the 4 mil component were both corona treated to a surface energy between 44 and 50 dynes/cm² and subsequently adhesively laminated together using the honeycomb pattern with a two part polyurethane. The adhesive was applied to give 1.2 parts by weight of adhesive solids per 200 parts by weight of partially laminated web.

The 10 mil unitary comparison web with a particularly high nylon content had a multilayered structure with the general composition and weight percentage of each layer being as follows: 18.8% of a mixture of ULDPE and LLDPE (87.2 wt % ULDPE, 10 wt % LLDPE, balance additives)/14.6% of tie layer for nylon adhesion (a mixture of 90 wt % ULDPE and 10 wt % anhydride modified LLDPE)/14.7% amorphous Nylon (a mixture of 85 wt % Nylon 6 and 15 wt % Nylon 6I/6T)/7.9% EVOH/14.7% amorphous Nylon (a mixture of 85 wt % Nylon 6 and 15 wt % Nylon 6I/6T)/14.6% of tie layer for nylon adhesion (a mixture of 90 wt % ULDPE and 10 wt % anhydride modified LLDPE)/14.7% amorphous Nylon (77 wt % Nylon 6, 15 wt % Nylon6I/6T, balance additives).

The 8 mil biaxially oriented partially annealed comparison web had a multilayered structure for one wall of the collapsed bubble with the general composition and weight percentage of each layer being as follows: 9% ULDPE (containing 6.5 wt % of additives)/21.5% of tie layer for nylon adhesion (a mixture of 50 wt % of mLLDPE and 50 wt % of an anhydride modified polyethylene copolymer)/15.5% Nylon (a mixture of 35 wt % Nylon 6, 45 wt % Nylon 6/69 and 20 wt % Nylon 6I/6T)/6.5% EVOH/15.5% Nylon (a mixture of 35 wt % Nylon 6, 45 wt % Nylon 6/69 and 20 wt % Nylon 6I/6T)/20% of tie layer for nylon adhesion (a mixture of 40 wt % mLLDPE, 30 wt % VLDPE and 30 wt % of anhydride modified LLDPE)/12% ethylene vinyl acetate (EVA) with a vinyl acetate (VA) proportion of between 26% and 28%. When treated at 90° C. it displayed a shrink in excess of 40% in both the machine direction (MD) and the transverse direction (TD).

In each film structure the additives indicated were a mixture of an antiblock additive, a slip additive and in some cases a processing aid.

Roll stock of each of the three webs was fed to a Multivac packaging machine and formed into approximately four inch deep cavities. Each cavity was filled with pork neck bones, covered by a web of another thermoplastic material, evacuated and heat sealed to a portion of the covering web to create a sealed package. The sealed packages were then separated from the remaining portions of the cavity forming web and the covering web.

The covering web was an 8 mil 9 layer blown film with an easy peel feature. It had a multilayer structure with the general composition and weight percentage of each layer being as follows: 1.2% of a mixture of mLLDPE and ULDPE (71.2 wt % mLLDPE, 25 wt % ULDPE, balance additives)/2.4% EVA with 5% VA contaminated with 28 wt % polybutene (PB) for peelability/14.5% ULDPE/9.4% tie layer for nylon adhesion (a mixture of 90 wt % ULDPE and 10 wt % of an anhydride modified VLDPE)/14.7% amorphous Nylon (a mixture of 85 wt % Nylon 6 and 15 wt % nylon 6I/6T)/7.9% EVOH/14.7% amorphous Nylon (a mixture of 85 wt % Nylon 6 and 15 wt % nylon 6I/6T)/20.3% tie layer for nylon adhesion (a mixture of 90 wt % ULDPE and 10 wt % of an anhydride modified VLDPE)/14.9% amorphous Nylon (a mixture of 77 wt % Nylon 6, 15 wt % Nylon 6I/6T, bal additives)

The sealed packages were then evaluated for integrity immediately after separation, twenty four hours after separation and after abuse testing. The abuse testing consisted of being subjected to one hour of vibration on a shaker table with a one inch amplitude and a frequency between about 120 and 300 RPM followed by being dropped from a height of five feet to a flat surface with the bottom of the cavity as formed on the Multivac machine parallel to the flat surface. The evaluation criterion was the visual observation that the package walls no longer tightly adhered to the package contents indicating a loss of vacuum. The results were as follows:

| Cavity Forming Web | Immediate Evaluation | | 24 Hour Evaluation | | Abuse Test Evaluation | | |
|---|---|---|---|---|---|---|---|
| | Leakers/ Total | Puncture Location | Leakers/ Total | Puncture Location | Leakers/ Total | Puncture Location | Sum Leakers/Total |
| Partially Laminated | 3/75 (4%) | 2 Cavity Web 1 Contam. Seal | 2/72 (3%) | 2 Cavity Web | 0/70 (0%) | None | 5/75 (7%) |
| High Nylon | 8/75 (11%) | 5 Cavity Web 3 Cover Web 1 Contam. Seal | 8/67 (12%) | 7 Cavity Web 1 Cover Web | 4/59 (7%) | 2 Cavity Web 2 Cover Web | 20/75 (29%) |
| Biaxially Oriented | 2/75 (3%) | 1 Cover Web 1 Contam. Seal | 2/73 (3%) | 2 Cover Web | 2/71 (3%) | 1 Cover Web 1 Contam. Seal | 6/75 (8%) |

Example 2

The cavity forming web of Example 1 was used as both the cavity forming web and the covering web in packaging six meat and bone products using a Multivac packaging machine in a manner quite similar to that of Example 1. In some cases it was found that a smaller die draw (i.e. a shallower package) gave fewer leakers. In other cases results, the venting of chamber used to evacuate the product containing cavity was adjusted to reduce the impact of hard product against a top plate of the packaging machine.

The typical venting of cavity evacuation chamber was, in selected cases, adjusted to reduce the likelihood of puncture of the covering web. After the product containing cavity is evacuated and the appropriate portion of the covering web is heat sealed to the cavity mouth, this portion is closely adjacent to the top plate of the machine which carries the seal bars which effect this heat sealing. Without adjustment of the venting, the air vented back into the chamber has a tendency to force the contents of the now sealed packages against the covering web portion forcing it into violent contact with this top plate. If the venting is adjusted to let air into the top of the chamber ahead of allowing air into the chamber by the bottom vents this impacting of the covering web portion against the top plate is reduced reducing the likelihood of punctures in this portion.

Two die set ups were used in this example. In one set up four rectangular dies were arranged two across and two further downstream than the other two with all four having their short sides parallel to the machine direction. The dies were about 3 inches deep with an open mouth of about 5.2 inches by 7.3 inches. The corners of the open mouth and of the junction of the side walls with the bottom had a radius of about 1.18 inches. In the other set up three rectangular dies were arranged side by side with their long edges parallel to the machine direction. The dies were about 1½ inches deep with an open mouth of about 4.67 inches by 11.1 inches. The corners of the open mouth and of the junction of the side walls with the bottom had a radius of about 0.79 inches.

The packages were evaluated by visual inspection for the loss of vacuum immediately after formation. The results were as follows:

| | Cut | | | | | | | |
|---|---|---|---|---|---|---|---|---|
| | Pork Necks | Short Ribs | Hind Shanks | Beef Feet | Beef Neck Bones | | Marrow Bones | |
| | | | | Packages Run | | | | |
| | 8 | 22 | 35 | 16 | 22 | 8 | 19 | 10 |
| Leakers | 0 | 5[1] | 0 | 0 | 15 | 2[2] | 9 | 0 |
| Die Draw | 3" | 3" | 3" | 3" | 3" | 1½" | 3" | 1½" |

[1] It is believed that fewer leakers would have been observed with proper venting.
[2] It is believed that the package was too small for the product causing more leakers.

In many cases no leakers were observed, which is a result that is highly unusual when packaging these bone containing meat products. It is expected that using a single wall film of an equivalent gauge would have resulted in a significant number of leakers where none were observed for the partially laminated double wall film.

The above disclosure is for the purpose of illustrating the present invention and should not be interpreted as limiting the present invention to the particular embodiments described but rather the scope of the present invention should only be limited by the claims which follow and should include those modifications of what is described which would be readily apparent to one skilled in the art.

What is claimed is:

1. A package comprising:
    a vacuum drawn cavity formed from a double wall partially laminated heat formable web comprising two independently manufactured thermoplastic films, the two films being partially laminated to each other such that less than 50% of the surfaces of the two films that face each other are laminated together; and
    wherein one of the films has a surface which does not face the other film and is heat sealable.

2. The package of claim 1, wherein the web further comprises an adhesive joining the two films that face each other together.

3. The package of claim 2, wherein the adhesive is present n a repeating pattern.

4. The package of claim 1, wherein said pattern is a honeycomb or spaced apart circles.

5. The package of claim 1, herein each of the films comprises at least two layer of nylon.

6. The package of claim 5, wherein at east one of the films comprises three layers of nylon.

7. The package of claim 6, wherein each of the films comprises a layer of ethylene vinyl alcohol between the layers of nylon.

8. The package of claim 1, wherein the two films being partially laminated to each other such that less than 25% of the surfaces of the two films that face each other are laminated together.

9. The package of claim 1, wherein the cavity has a draw depth of at least 2 inch.

10. The package of claim 9, wherein the cavity has a draw depth of at least 3 inch.

* * * * *

UNITED STATES PATENT AND TRADEMARK OFFICE
CERTIFICATE OF CORRECTION

PATENT NO. : 9,505,508 B2
APPLICATION NO. : 14/301722
DATED : November 29, 2016
INVENTOR(S) : Otacilio T. Berbert Page 1 of 1

It is certified that error appears in the above-identified patent and that said Letters Patent is hereby corrected as shown below:

In the Specification

Column 3, Line 24, after "70" delete "or" and insert -- for --.

Column 4, Line 19, delete "far" and insert -- for --.

Column 7, Line 20, delete "4 mill" and insert -- 4 mil 7 --.

In the Claims

Claim 3 Line 1, delete "n a" and insert -- in a --.

Claim 5 Line 1, delete "herein" and insert -- wherein --.

Claim 6 Line 1, delete "at east" and insert -- at least --.

Signed and Sealed this
Twenty-seventh Day of February, 2018

Andrei Iancu
*Director of the United States Patent and Trademark Office*